United States Patent [19]

Sherman

[11] 3,946,134

[45] Mar. 23, 1976

[54] METHOD OF ENCAPSULATING PARTICLES AND THE RESULTANT PRODUCT

[75] Inventor: Caryl M. Sherman, Shaker Heights, Ohio

[73] Assignee: The Harshaw Chemical Company, Cleveland, Ohio

[22] Filed: June 4, 1974

[21] Appl. No.: 476,245

Related U.S. Application Data

[63] Continuation-in-part of Ser. No. 381,640, July 23, 1973, abandoned.

[52] U.S. Cl............. 428/403; 106/298; 106/308 B; 106/309; 427/212; 427/215; 427/216; 427/343; 427/372; 428/404
[51] Int. Cl.$^2$...................... B32B 9/00; B32B 15/02
[58] Field of Search.................. 117/100 A, 100 B; 106/308 B, 309, 298; 427/212, 215, 216, 343, 372; 428/403, 404

[56] References Cited

UNITED STATES PATENTS

| | | | |
|---|---|---|---|
| 2,251,869 | 8/1941 | Gamble et al. | 134/78 |
| 2,668,776 | 2/1954 | Miller | 106/300 |
| 3,276,892 | 10/1966 | Pitrol | 106/288 |
| 3,370,971 | 2/1968 | Linton | 106/298 |
| 3,434,857 | 3/1969 | Seelig | 106/308 |
| 3,650,783 | 3/1972 | Yates | 106/308 B |
| 3,767,455 | 10/1973 | Claridge et al. | 117/100 B |

Primary Examiner—Ralph Husack
Assistant Examiner—Dennis C. Konopacki

[57] ABSTRACT

A protective coating consisting of an aluminum or magnesium phosphate complex is used to encapsulate a wide variety of organic and inorganic particles. The coating is particularly applicable to organic and inorganic pigments and serves to improve the light, heat and chemical stability of these pigments. The coating is formed in situ by complexing the phosphate with the metal, preferably in the presence of ions of fluoride or fluoborate and depositing the same onto the surface of the particles.

21 Claims, No Drawings

METHOD OF ENCAPSULATING PARTICLES AND THE RESULTANT PRODUCT

RELATED APPLICATIONS

This application is a continuation in part of Ser. No. 381,640 filed July 23, 1973, now abandoned.

BACKGROUND OF THE INVENTION

1. Field of the Invention

This invention relates to the coating of particles with a continuous, dense, protective layer. The invention is particularly applicable to the encapsulation of organic and inorganic pigments to impart improved chemical, thermal and light stability thereto.

2. Description of the Prior Art

Much work has been done on the encapsulation or coating of inorganic and organic pigments with silica or a combination of silica and alumina as exemplified by a number of patents such as U.S. Pat. No. 3,370,971. The particles are encapsulated primarily to improve one or more of the properties of the pigment such as heat or chemical stability. However, the effectiveness of these coatings is somewhat limited for a number of reasons. For example, they tend to be brittle. Furthermore, their use is restricted, for the most part, to inorganic pigments. The procedure for applying the coatings is somewhat complicated and the heat stability of the coated pigments is only marginally acceptable.

A method of coating pigment particles of $TiO_2$ with a layer of aluminum orthophosphate is described in U.S. Pat. No. 2,668,776. This method involves the addition of an alkali metal orthophosphate to a suspension of the pigment followed by the addition of aluminum salt to the suspension to cause mass precipitation of a gelatinous aluminum orthophosphate onto the pigment particles. The porous coating represents between 1 and 3.5% of the total weight of the partially coated particle and serves to improve the drying rate and stability of the pigment in a paint film.

The color fastness and weather stability of lead chromates are improved according to the teachings of U.S. Pat. No. 3,434,857, by coating the same with between 4 and 8% by pigment weight of a mixture of sodium silicate and antimony trifluoride or other compound capable of yielding ions of antimony and fluoride. The favorable results are achieved only by following the precise sequence of addition and by maintaining close control of the pH.

German DAS No. 1,288,714 describes a method of coating lead chromate pigment particles with a layer of zinc phosphate for improved $H_2S$ resistance. Zinc in the form of zinc oxide is reacted with phosphoric acid at a pH of 6 or more to form the coating. The zinc is known to form a simple salt solution with the phosphate and does not normally form a complex with the phosphate ion.

SUMMARY OF THE INVENTION

It has now been found that one or more characteristics, such as the chemical, thermal or light stability, of a particle such as an inorganic chrome pigment or an organic azo pigment is improved by encapsulating each of the particles with a continuous layer or skin of a polymeric metal phosphate complex, optionally containing up to 30 weight percent of fluoride ions or ions of $BF_4^-$. The coating, which normally constitutes between 5 and 30% by weight of the particle, has a thickness of between about 25A and 300A.

The coating is typically applied by controlled polymerization from a liquid medium in which the particles are generally insoluble. The metal salt capable of forming the complex, and the fluoride or $BF_4^-$ ions, if used, are mixed together in solution after which the phosphate is added while maintaining the pH of the medium in a range of between 1 and 6 where the precipitation of the metal salt does not occur prematurely. The phosphate is present in solution in an amount that is sufficient to give a molar ratio of Al/P in the coating of between 0.8 and 1.8. As the aluminum phosphate complex is formed, it slowly insolubilizes, generally in less than 20 minutes and forms a fine colloid. The particles are intimately contacted and coated by the colloidal metal phosphate complex after which the liquid medium is neutralized and the coated particles are separated from the liquid medium by filtering or other means. The coated particles are then dried, preferably at an elevated temperature but one that is below the degradation temperature of the particle.

DETAILED DESCRIPTION OF THE INVENTION

The present invention relates to an improved particle encapsulated in a protective layer of a metal phosphate complex, preferably containing fluoride or $BF_4^-$ ions. The invention also covers a process whereby encapsulation is achieved. The novel protective layer is dense and continuous and typically serves to improve the chemical, light and thermal stability of the particle.

The process is applicable to a wide variety of inorganic as well as organic and metallo-organic particles. The inorganic particles are characterized by various inorganic pigments such as (a) inorganic color pigments including lead chromates by themselves, as coatings over silica, and as solid solutions with lead molybdate and lead sulfate; cadmium sulfides; ferrocyanides and various complex pigments such as cobalt aluminate and nickel antimony titanate; (b) white hiding pigments such as the carbonates, sulfates and silicates of lead, and oxides of titanium, zinc, antimony and zirconium; (c) fillers such as calcium carbonate, silicates of calcium, magnesium and aluminum, and sulfates of barium and calcium; (d) metals such as aluminum, iron and copper and water insoluble salts of metals; (e) organic color pigments including nitroso compounds, monoazo, diazo compounds, alizarine or dihydroxy anthraquinones, vat dyes and phthalocyanine pigments.

By following the procedures herein described, particles are completely coated with a dense protective layer having a thickness of between about 25A and about 300A, preferably between 100A and 200A, as determined by electron micrography. The weight of the coating comprises between about 5 and about 30% of the total weight of the coated particle. When encapsulating very small particles or particles having a high surface area or low density, the coating must sometimes be used in an amount as high as 40 to 50% of the total pigment weight in order to achieve complete coverage.

It has been found, analytically, by nitrogen absorption, that the surface area of the particle, after encapsulation, is typically no greater than that of the uncoated substrate after an adjustment is made for the relative densities of the particles before and after encapsulation.

The particles to be encapsulated are typically pretreated by passing them through a ball mill, micropulverizer, hammer mill, or sand mill or by grinding them in a mortar and pestle. This serves to break up the particle agglomerates thereby enabling encapsulation of primary or individual particles. The particles are dispersed in a fluid carrier, generally one in which the particles are insoluble, to form a slurry before or after the pretreatment. Water is typically used as the carrier; however, any organic or inorganic polar or non-polar liquid can be used as a carrier so long as it does not dissolve the particles or adversely affect the formation of the phosphate complex or the encapsulation of the particles. The mechanical pretreatment in a liquid medium serves to effectively remove the molecular layer of air surrounding each particle, thereby facilitating complete wetting of the same.

The organic or inorganic particles, in finely divided form, are made into a slurry to which is normally added, aluminum acetate or other soluble basic aluminum salt, such as the dibasic formate, which is capable of forming a complex with the phosphate, and which has no tendency to dissolve the particle or otherwise adversely affect the same. The phosphate ions are then added to the slurry as an ortho phosphate or a precursor therof, after which the aluminum and the phosphate slowly begin to form a low molecular weight colloidal polymeric complex which condenses on the surface of the particles as a continuous, dense adherent coating or skin. The temperature is preferably maintained below 40°C. to promote the controlled precipitation and to prevent flocculation and the formation of large particles of the complex. The pH of the slurry during the addition of the phosphate ions, the formation of the metal phosphate complex and the condensation of the coating on the particle is maintained in a range between 1 and 6 to prevent premature preciptitation of the metallic salt. After the reaction is complete, the pH of the slurry is adjusted, if necessary, to a final value of between about 6 and about 7.5.

If the colloidal complex is formed in the absence of particles, the colloid will remain stable for months without the formation of a floc or gel. The slow steady formation of the colloid in solution according to the invention can be observed by continuously monitoring the gradual decrease in the amount of light transmitted through the solution over a period of several minutes as compared to the almost instantaneous decrease in transmittance during the formation of a mass precipitate produced, for example by mixing together an alkali metal phosphate and an acid aluminum salt.

Although aluminum acetate has been found to be particularly suitable as a complexing agent, other aluminum salts including organo aluminum compounds can be substituted therefore as long as they are capable of performing the same function, do not have an adverse effect upon the pigment, and are soluble in an aqueous medium. Inasmuch as the sulfates, chlorides and nitrates of aluminum interfere with the formation of complexes with the phosphate, these aluminum salts are not usable in the present invention. However, it has been found that the dibasic formate of aluminum can be used in place of the acetate. It has also been discovered that magnesium forms a similar complex with ortho phosphate, with or without fluoride. Soluble forms of the magnesium such as magnesium acetate are useful. The use of zinc and other metals that are present in simple solution and that do not form a complex with phosphate are not covered by the present invention.

The fluoride or fluoborate ions are preferably added to the slurry in soluble form. Ammonium bifluoride, hydrofluoric acid and sodium fluoride have been found to be suitable for this purpose. The fluoride ions may be added to the slurry along with or following the addition of the metal salt complexing agent. If $BF_4^-$ ions are used in place of the fluoride ions, these are preferably added as the ammonium salt.

The phosphate ions should preferably be added to the slurry in the form of ortho or meta phosphoric acid or a precursor thereof, such as an ester of phosphoric acid.

Salts of phosphoric acid are generally unsuitable inasmuch as they tend to cause precipitation of the complexing agent, particularly aluminum acetate. Furthermore, the addition of phosphate as sodium phosphate is unsuitable and should be avoided, especially when inorganic chromate pigments are being coated inasmuch as the sodium, if present in excess, readily reacts with the chromate and solubilizes the pigment.

The presence of fluoride or fluoborate in the coating improves the light stability of the coating and the thermal stability of most inorganic pigments as well as some of the pure organic pigments such as Hansa yellow. However, the improvement in metal organic pigments is marginal. Furthermore, when the coating is used on particles such as aluminum, $TiO_2$ or other materials used for purposes other than pigments, the fluoride or fluoborate is unnecessary and may be omitted without detracting from the integrity or effectiveness of the coating. However, the effect of the fluoride and the coating in improving stability appear to be additive and not synergistic.

The time that is required to form the aluminum phosphate complex and to deposit the protective coatings on the particles, is normally 20 minutes or less and can be closely regulated by controlling the pH of the solution, the ratio of aluminum to phosphorus, and the concentration of the components in solution.

The pH of the solution is maintained in a range of between about 1 and about 6, preferably between about 2 and about 3.5 during the formation of the colloid. A pH below 1 tends to favor the ionic constituents. On the other hand, if the pH is above 6, a detrimental amount of $Al(OH)_3$ floc is formed.

The ratio of aluminum to phosphorus in the coating is generally between 0.8 and 1.8 with a preferred range being between 0.8 and 1.2. The ratio of aluminum to phosphorus in solution may vary from as low as 0.2 to about 2.0. The higher amounts of metal in the complex appear to enhance the $H_2S$ resistance of the coating.

The formation of the colloidal sol is also dependent upon the concentration of the aluminum salt and the orthophosphate or its precursor in solution. The formation of the sol can occur in 5 seconds or less at high concentrations of 20 mg/ml, whereas a formation time of 20 minutes is not uncommon for very dilute solutions, as low as 0.5 mg/ml. Also, undesirable floc formation is precluded at low concentrations. The particles in the sol are between 50A and 600A in size with high Al/P ratios favoring the formation of smaller particles, typically under 200A, considerably smaller than the size of particles produced by flocculation.

When a coating of the desired thickness or weight is achieved, the encapsulation is halted by the neutralization of the sol using a suitable base such as trisodium phosphate or a compound which decomposes to form a base such as urea, acetamide or the like. A particularly effective neutralization procedure is first to add dilute ammonium phosphate followed by the addition of biammonium phosphate. In addition to terminating the formation of the colloid on the particles, neutralization appears to fix or anchor the coating onto the particle. The pH is adjusted to a value of between about 6.0 and about 7.5 during neutralization. If the final pH is above this value, the texture, color and chemical resistance of the coating and the coated particle are adversely effected.

At the completion of the encapsulation, the coated particles are recovered by filtration or other suitable means and are then dried by heating to a temperature below that likely to cause the substrate to degrade. A temperature of 150°C. has been found to be acceptable for lead chromate and other inorganic pigments, whereas a temperature of 50° to 150°C. for organic pigments is satisfactory.

The following examples are presented to more fully illustrate the present invention:

EXAMPLE 1

50 grams of finely divided lead chromate is blended into water to give a 500 milliliter slurry. To this is added a solution of 8.37 grams of aluminum acetate* and a solution of 3.2 grams of ammonium bifluoride, each dissolved in 50 milliliter deionized water. The slurry is then stirred at room temperature after which 4.73 grams of $H_3PO_4$ (85%) diluted to 50 milliliters is added. A colloidal sol of aluminum phosphate slowly forms and deposits on the pigment particles in the slurry. Throughout this procedure, the pH of the slurry is controlled between 3 and 6 to prevent attack and degradation of the lead chromate by acid or alkali, and to preclude the pigment from solubilizing. Furthermore, maintaining the pH above 3 precludes the undesirable reduction of the hexavalent chromate to the trivalent form. After 15 minutes, the pH is adjusted to 7.4 with about 85 milliliters of 30% $(NH_4)_2HPO_3$. The slurry is pressure filtered to recover the pigment and the pigment is dried at 50°C for 16 hours.

*Sold by the Union Carbide Corporation as Niaproof Aluminum Acetate, basic, stabilized with boric acid.

A portion of the coated pigment is mixed into an alkyd resin vehicle in an amount of 15 weight percent of pigment, and a drawdown of the same is exposed along with a drawdown of an uncoated pigment in the same vehicle, to a fadometer test for 100 hours. One-half of each panel is shielded from light. The color retention of the coated pigment is noticeably better than that of the uncoated panel.

Another portion of the coated pigment is blended, in an amount of 1% by weight, with styrene granules which are heated and extruded into a first test panel which is subjected to a heat test along with a second panel containing 1% of the uncoated pigment and a third panel containing 1% of a pigment coated with a layer consisting of 20% silica, 4% alumina and $TiO_2$. Each panel is heated to the breaking temperature which is the temperature at which visual darkening occurs. The first and third panels are heated up to 575°F at which temperature a comparison reveals that the panel coated according to the teachings of the present invention does not darken as much as the panel coated with $SiO_2/Al_2O_3/TiO_2$. In the second panel containing the unencapsulated pigment, darkening occurs at about 425°F.

The chemical stability of the coated pigment is compared with that of the uncoated pigment in the presence of $H_2S$, NaOH and HCl. In all instances, the degradation of the uncoated pigment is much more rapid than that of the coated pigment.

EXAMPLE 2

A monoazo pigment, BON Maroon 1081 is encapsulated using the method of Example 1. Care is exercised during encapsulation to insure that the pH is maintained below about 6 to prevent degradation of the pigment. The encapsulated pigment is dried at 150°C for 24 hours while retaining its texture and most of its color characteristics. An untreated pigment is totally degraded to a brown sintered mass at this temperature in 1.5 hours.

EXAMPLE 3

Encapsulation of a monoazo Hansa Yellow pigment is carried out according to the following procedure:

83.6 parts of a presscake containing 30% by weight pigment is diluted to 300 parts with deionized water. A solution of 5.23 parts aluminum acetate and 1.5 parts $NH_4HF_2$ in 60 parts of water is added with moderate agitation. When the pigment completely dispersed, 3 parts of $H_3PO_4$ diluted to 28 parts of water is added to the suspension with agitation at room temperature.

After a reaction time of 15 minutes, 12 parts of $(NH_4)_2HPO_3$ dissolved in 40 parts water is added slowly with agitation to neutralize the suspension. This is followed by filtering and drying at 150°C for 16 hours.

The encapsulated pigment and an untreated sample are dispersed in xylene and are checked colormetrically to determine how much of each sample is dissolved. The encapsulated pigment demonstrates superior solvent resistance.

The thermal stability of the encapsulated Hansa Yellow is checked by dispersing the same in PVC along with a comparable amount of an untreated pigment and heating them both to 440°F for 5 minutes. The color retention of the treated pigment is considerably better than that of the untreated pigment.

EXAMPLE 4

Aluminum powder (14.68 parts) is diluted and gently dispersed in 250 parts of deionized water after which 5.23 parts of aluminum acetate and 1.6 parts of ammonium bifluoride dissolved in 60 parts of water are added with agitation. Three parts of 85% $H_3PO_4$ diluted in 25 parts of water is then added with further agitation. At the end of 15 minutes, ammonium phosphate is added to neutralize the reaction after which the suspension is filtered and dried.

An examination of the aluminum flakes under an electron microscope (20,000x) shows each flake to be substantially completely coated with the aluminum fluorophosphate. The coating results in a noticeable improvement in the wettability of the aluminum when dispersed in a medium soya alkyd vehicle.

EXAMPLE 5

Twenty-five grams of chrome yellow pigment is slurried with 200 ml. of water. Aluminum acetate stabilized with boric acid is added in an amount of 12.5 ml. of a 0.2 g./ml. solution. Ten ml. of 0.1 ml./ml. 85% $H_3PO_4$ is then added to give a molar ratio Al/P of 0.9 in solution.

Nuclei begin to deposit on the pigment particles after about 5 minutes and nucleation is substantially complete in about 30 minutes. Additional aluminum acetate and phosphoric acid are added to cause precipitation. Crystals of urea then added and the slurry is heated to slowly raise the pH. The change in pH serves to precipitate additional coating onto the nuclei and to further insolubilize the coating. When incorporated into general purpose polystyrene, the encapsulated pigment is found to have excellent heat stability.

EXAMPLE 6

A solution is prepared by adding 90 g. of Al(OH)$_3$ to 294 ml. deionized water followed by the addition of 143 ml. of 85% H$_3$PO$_4$ and 50 ml. H$_3$PO$_3$F. Forty milliliters of the solution is added to a slurry containing 25 gm. of chrome yellow pigment in 200 ml. of H$_2$O. Methyl alcohol is added over a half hour period to cause the slow insolubilization of the aluminum phosphate complex into a dense colloid which is desposited on the particle surface. A dilute solution of ammonium phosphate is added to complete the formation of the colloid. The coated particles are filtered and dried at 150°C for 4 hours and are found to exhibit excellent resistance to H$_2$S and good heat resistance.

EXAMPLE 7

A saturated solution of magnesium phosphate is prepared by mixing 75 gm of magnesium carbonate in 350 ml boiling water. 100 ml of 85% H$_3$PO$_4$ is then added. To one-half of the solution is added 48% HF to form the fluorophosphate complex. The two solutions are each slurried with lead chromate pigment after which ethanol is slowly added to each to cause formation of the sol which deposits on the particles. The encapsulated pigments are filtered and dried at 170°C for 2 hours without darkening and when incorporated into general purpose polystyrene both were thermally stable at 625°F.

EXAMPLE 8

Surface area measurements are carried out on particulate TiO$_2$ and on lead chromate pigments, untreated, coated according to the present invention, and coated according to a prior art process such as that described in U.S. Pat. No. 2,668,776. The surface area is determined by nitrogen adsorption and is calculated using the BET method described on pp. 309–19 of J. American Chemical Society, Vol. 60. The net change in the product of surface area and particle density between the uncoated and the treated particle is then noted. A large positive net change indicates that the coating is irregular, incomplete and largely non-adherent, whereas a low or negative net change indicates good coverage of the particles.

According to the prior art method, the TiO$_2$ is slurried with H$_2$O and trisodium phosphate is added. The slurry is stirred for 5 minutes after which aluminum sulfate in water is added dropwise for 10 minutes and the slurry is stirred for 15 minutes. The slurry is neutralized to a pH of 7.2 with 10% NH$_4$OH. The pigment is filtered, heated for one hour at 60°C and dried at 110° C for 6 hours.

Samples were prepared using the teachings of the present invention by adding aluminum acetate followed by the sequential addition of phosphoric acid and diammonium phosphate. The coated pigment was filtered and was dried at 110°C for 6 hours.

The same techniques were also used to coat particles of lead chromate. The change in surface area (dS) is calculated as the difference between the surface area of the coated product times its density and the surface area of the uncoated particle times its density. The values are shown in Table I.

TABLE I

| Substrate | Process | % Coating (by weight) | Surface Area | Density | dS |
|---|---|---|---|---|---|
| TiO$_2$ | Control |  | 5.2 | 4.14 |  |
|  | Prior Art | 3 | 7.9 | 3.82 | 8.65 |
|  | Prior Art | 20 | 19.4 | 3.82 | 52.54 |
|  | Present Invention | 3 | 6.0 | 3.7 | 0.67 |
|  | Present Invention | 20 | 11.3 | 3.7 | 20.28 |
| PbCrO$_4$ | Control |  | 20.5 | 6.12 |  |
|  | Prior Art | 3 | 31.2 | 6.02 | 62.36 |
|  | Prior Art | 20 | 28.2 | 5.41 | 27.10 |
|  | Present Invention | 3 | 26.4 | 6.02 | 33.47 |
|  | Present Invention | 20 | 12.8 | 5.41 | −56.21 |

Although the exact mechanism or series of reactions involved in this invention is not fully understood, the aluminum or magnesium salt, and the phosphate appear to form a metal phosphate complex which has a positive charge or electrokinetic potential and which is strongly attracted to particles that have a negative charge on their surface. The adjustment of the final pH to a value of between 6 and 8 appears to inactivate the complex, neutralize its electrokinetic charge, and prevent the migration of the complex from the pigment surface. Adsorption of the coating on to the particle does not appear to be an important factor in the mechanism.

A compositional analysis of the metal fluorophosphate coating shows the same to contain between 5 and 30% by weight of fluoride ion present within the aluminum phosphate lattice structure. Optimum heat stability is obtained on inorganic pigments when the fluorine is present at or near the stoichiometric amount of 19–20 weight percent.

The present invention has several advantages over prior art coatings, although, as applied to a specific encapsulated particle, not all of these benefits may be manifested. However, one or more of the following advantages have been noted:

a. The protective layer is, per se, chemically stable and as such, contributes to the chemical stability of the particle;

b. The protective layer does not appear to have the brittleness of other types of coatings, and as a result, remains tenaciously adhered to the surface of the particle;

c. The stability of the particle to ultra-violet light and to sunlight is improved;

d. The thermal stability of the particle, i.e., its resistance to darkening at elevated temperature, is increased;

e. The solubility of the particles sensitive to olefin resins and carriers is decreased;

f. The encapsulation can be carried out using conventional equipment. Accordingly, the capital investment for new sophisticated equipment is minimized;

g. The encapsulation of the pigment particles involves basically a very minor change in the procedure for manufacturing the pigments;

h. The coatings of the present invention are particularly suitable for use with color pigments because of their inherent transparency;

j. In some instances, the wettability of the coated particle in a particular system is enhanced, and k. The coating forms a complete, not a discontinuous, skin around the particles.

It should, furthermore, be noted and understood that other variations can be made in practicing this invention without deviating from the teachings thereof. For example, it is possible to include other additives in the metal phosphate complex to further improve properties such as heat and chemical stability. Furthermore, additives such as methacrylates can be added to the coated pigment to improve the stability of the complex.

Other methods can be used to control the rate of deposition, or the density or thickness of deposit. For example, the pH of the solution can be changed by ion exchange to promote gradual insolubilization of the complex. Alternatively, a base such as urea can be added to the solution and can be decomposed by heating to raise the pH; the rate of decomposition being dependent upon the temperature of the solution. Thus by regulating the input of heat into the solution, the decomposition and thus the pH can be closely controlled.

The ease of encapsulation depends, at least partially, on the receptivity of the particle surface to the coating. The present invention contemplates the conditioning of the particle surface prior to or during contact with the colloidal sol to facilitate wetting of the surface. Thus, surfactants, chemical etchants, ball milling, ultrasonics and the like can be used to condition the surface either before or during encapsulation.

It has been noted that the addition of $TiO_2$ and/or $CeO_2$ prior to encapsulation appears to further improve the light stability of many inorganic color pigments. This and other procedures can be used in conjunction with the present invention to achieve even greater chemical and physical improvements in the encapsulated particles.

I claim:

1. A process of forming a continuous, dense, protective, adherent skin of a metal phosphate complex on a solid particulate substrate wherein the metal is selected from the group consisting of aluminum and magnesium comprising
   a. blending a water soluble basic salt of the metal with an ortho phosphate or a precursor thereof, exclusive of a sodium salt, in an aqueous solution to form a complex thereof, the concentration of the blend being less than about 20 mg/ml of solution,
   b. maintaining the solution in a pH range of between about 1 and about 6 for a period of between a few seconds and about 20 minutes in the presence of the particulate substrate to slowly insolubilize the complex and to deposit it as a colloidal sol completely encapsulating the substrate,
   c. neutralizing the sol to terminate the formation of the complex, and
   d. recovering the encapsulated substrate.

2. The process of claim 1 wherein the encapsulated substrate is, after deposition, dried at a temperature below the degradation temperature of the substrate.

3. The process of claim 2 wherein the metal phosphate complex is formed in the presence of ions of fluoride, fluoborate or a mixture of the two.

4. The process of claim 3 wherein the metal phosphate complex contains up to 30 weight percent of fluoride or fluoborate.

5. A process of forming a continuous, dense protective and adherent coating of aluminum phosphate complex on a solid particulate substrate comprising:
   a. blending an aluminum compound selected from the group consisting of aluminum acetate and aluminum formate with an orthophosphate or with a phosphorous compound capable of forming an orthophosphate exclusive of sodium phosphate in an amount such that the mol ratio of aluminum to phosphorous in the coating is between 0.8 and 1.8;
   b. contacting the particulate substrate with a dilute solution containing between 0.5 and 20 mg. of the blend per ml of solution;
   c. maintaining the solution at a pH of between about 1 and about 6, at a temperature of less than about 40°C for a period of between a few seconds and 20 minutes to form a colloidal sol of the complex having a particle size below about 600A.
   d. depositing the colloidal sol completely around the substrate to a thickness of between 25A and 300A,
   e. neutralizing the sol to terminate the formation of the complex, and
   f. recovering and drying the coated substrate at a temperature below the degradation temperature of the substrate.

6. The process of claim 5 wherein the aluminum compound is aluminum acetate which is stabilized with boric acid.

7. The process of claim 5 wherein the sol is deposited on the substrate to a thickness of between about 100A and 200A.

8. The process of claim 5 wherein the aluminum phosphate complex is formed in a solution containing ions of $F^-$, $BF_4^-$ or mixtures of the two.

9. The process of claim 8 wherein up to 30 weight percent of the deposit consists of fluoride or fluoborate.

10. The process of claim 5 wherein the mol ratio of aluminum to phosphorus in the coating is between about 0.8 and about 1.2.

11. The process of claim 5 wherein the particulate substrate is an inorganic material selected from the group consisting of pigments, fillers, metals, metal oxides and insoluble metal salts.

12. The process of claim 5 wherein the particulate substance is an organic color pigment.

13. The process of claim 8 wherein the particulate substance is an inorganic pigment.

14. The process of claim 5 wherein the pH of the solution during the formation of the sol is between about 2 and about 3.5.

15. The process of claim 5 wherein the surface of the substrate is conditioned prior to or during contact with the solution to facilitate wetting of the surface by the solution.

16. A coated particle comprising a particulate substrate and a continuous, dense layer of protective coating completely encapsulating the substrate, said coating composed of a metal phosphate complex wherein the metal is selected from the group consisting of aluminum, magnesium and mixtures thereof; the coating comprising between about 5 and about 50% of the total particle weight and having a thickness of between about 25A and about 300A.

17. The particle of claim 15 wherein the metal is aluminum and the molar ratio of aluminum to phosphorus is between about 0.8 and about 1.8.

18. The particle of claim 17 wherein the molar ratio is between about 0.8 and about 1.2.

19. The particle of claim 15 wherein the substrate is an inorganic pigment and the complex contains fluoride or fluoborate in an amount up to 30 weight percent of the coating.

20. The coated particle of claim 16 wherein the surface area of the coated particle, when measured by nitrogen absorption method is no greater than that of the uncoated substrate when adjusted for density.

21. The coated particle according to claim 16, wherein the particulate substrate comprises a chromate pigment showing improved stability to $H_2S$.

* * * * *